United States Patent Office 2,780,023
Patented Feb. 5, 1957

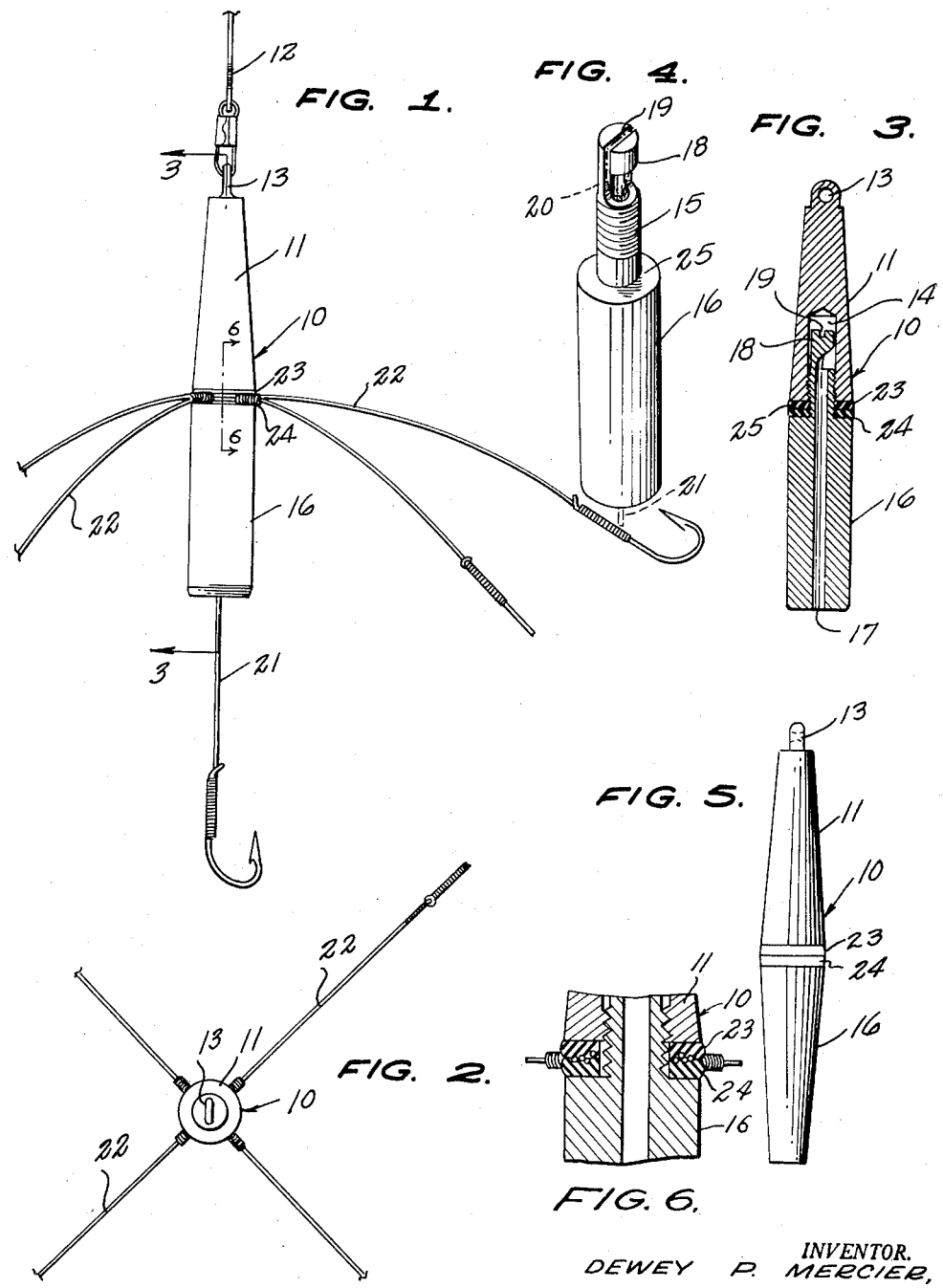

2,780,023

FISHING SINKER

Dewey P. Mercier, Charlotte, Vt.

Application August 9, 1955, Serial No. 527,192

3 Claims. (Cl. 43—42.74)

The present invention relates to fishing sinkers.

An object of the present invention is to provide a fishing sinker having means for quickly and easily attaching the end portions of fish hook snells thereto.

Another object of the present invention is to provide a fishing sinker having interchangeable parts so that the sinker can be varied as to weight and shape.

A further object of the present invention is to provide a fishing sinker having means for holding a plurality of fish hook snells extended in fanwise relation.

A still further object of the present invention is to provide a fishing sinker of simple construction, one sturdy in construction, economical to manufacture and assemble, and one which is highly effective in action.

These and other objects and advantages of the present invention will be fully apparent from the following description when taken in connection with the annexed drawings, in which:

Figure 1 is an elevational view of the fishing sinker of the present invention showing it supporting a plurality of snelled hooks, Figure 2 is a top plan view, Figure 3 is a sectional view taken on the line 3—3 of Figure 1, Figure 4 is an isometric view of the male element portion of the fishing sinker of the present invention, Figure 5 is an elevational view of the male and female elements in assembled condition, and Figure 6 is a fragmentary sectional view taken on line 6—6 of Figure 1.

Referring in greater detail to the drawing in which like numerals indicate like parts throughout the several views, the fishing sinker of the present invention, indicated by the reference numeral 10, comprises a female element 11 having means on one end thereof for attachment of a fishing line 12, such means embodying an eye-formation 13 receiving an end portion of the fishing line 12. The female element 11 has a bore 14 extending inwardly of the other end and terminating at a point spaced from said other end.

A male element 16 having a bore 17 extending axially therethrough for insertion of an end portion of a fish hook snell has a portion 15 adjacent one end extending into the part of the bore of said female element adjacent said other end of the latter and detachably secured to the adjacent portion of the bore 14, there being cooperating threads on the portion 15 of the male element 16 and within the adjacent portion of the bore 14 of the female element 11.

Means projects from the end of the male element having the portion 15 and is received within the bore 14 of the female element 11 adjacent its terminating point for engagement with a portion adjacent one end of a fish hook snell when an end portion of a fish hook snell is inserted in the bore 17 in the male element 16. Specifically, this means consists in an extension 18 projecting from the free end of the portion 15 of the male element 16 and includes a groove 19 extending diametrically across the free end of the extension 18 and along the sides of the extension and connected in communication with the bore 17 of the male element 16. As shown in dotted lines in Figure 4, a looped portion 20 of a fish hook snell 21 is received in the groove 19 and when the extension 18 is within the bore 14 of the female element, the looped portion 20 of the fish hook snell cannot be removed from its engagement with the extension 18, the latter being dimensioned so as to fit closely within the bore 14.

Gripping means is provided on the portion 15 of the male element 16 extending into the bore of the female element 11 and engaging said other end of the latter element for attachment of an end portion of another fish hook snell and consists in a pair of washers 23 and 24 fabricated of a resilient material such as rubber or the like surrounding the portion 15 of the male element 16 adjacent the shoulder 25 of the latter, the washers 23 and 24 being operable to hold a plurality of looped end portions of other fish hook snells as seen in Figures 1 and 2, arranged fanwise or in any pattern desired.

In use, the end portion of a fish hook snell is inserted in the bore in the male element, and its looped end portion is inserted within the groove in the extension. Screwing the male element into the female element secures the looped portion of the fish hook snell firmly within the bore of the female element. Other fish hook snells may have their loops interposed between the washers 23 and 24, the washers being constructed of such soft material as to embracingly engage the looped end portions of the snells firmly against removal therefrom.

What is claimed is:

1. A fishing sinker comprising a female element having means on one end thereof for attachment of a fishing line, said female element having a bore extending inwardly of the other end and terminating at a point spaced from said other end, a male element having a bore extending axially therethrough for insertion of an end portion of a fish hook snell therein, said male element having a portion adjacent one end extending into the part of the bore of said female element adjacent the other end of the latter element and detachably secured to the adjacent portion of said bore, and an extension projecting from said one end of said male element and received within the part of the bore of said female element adjacent to its terminating point, said extension being dimensioned to fit within the bore within said female element and having a groove extending diametrically across its free end on each side thereof connecting in communication with said bore in said male element, said groove being adapted to receive the portion adjacent one end of the fish hook snell against disengagement from said extension.

2. A fishing sinker comprising a female element having means on one end thereof for attachment of a fishing line, said female element having a bore extending inwardly of the other end and terminating in a point spaced from said other end, a male element having a bore extending axially therethrough for insertion of an end portion of a fish hook snell therein, said male element having a portion adjacent one end extending into the part of the bore of said female element adjacent the other end of the latter element and detachably secured to the adjacent portion of said bore, an extension projecting from said one end of said male element and received within the part of the bore of said female element adjacent its terminating point, said extension being dimensioned to fit within the bore in said female element and having a groove extending diametrically across its free end and on each side thereof connecting in communication with said bore in said male element, said groove being adapted to receive the portion adjacent one end of the fish hook snell against disengagement from said extension and gripping means embodying a pair of resilient washers on said portion of said male element extending into the bore of said female element and engaging the other end of said female element for attachment of an end portion of another fish hook snell.

3. A fishing sinker comprising a female element having means on one end thereof for attachment of a fishing line, said female element having a bore extending inwardly of the other end and terminating at a point spaced from said other end, a male element having a bore extending axially therethrough for insertion of an end portion of a fish hook snell therein, said male element having a portion adjacent one end extending into the part of the bore of said female element adjacent the other end of the latter element and detachably secured to the adjacent portion of said bore, an extension projecting from said one end of said male element and received within the part of the bore of said female element adjacent the terminating point of the last-named bore, said extension being dimensioned to fit within the bore in said female element and having a groove extending diametrically across its free end and on each side thereof connecting in communication with said bore in said male element, said groove being adapted to receive the portion adjacent one end of a fish hook snell against disengagement from said extension, and gripping means on said portion of said male element extending into the bore of said female element and engaging the other end of said female element for attachment of an end portion of another fish hook snell.

References Cited in the file of this patent
UNITED STATES PATENTS

| | | |
|---|---|---|
| 86,786 | Tellgmann | Feb. 9, 1896 |
| 1,352,979 | Lawrence | Sept. 14, 1920 |
| 1,583,795 | Pasturzak | May 11, 1926 |
| 1,670,185 | Bond | May 15, 1928 |
| 2,037,232 | Hendriks | Apr. 14, 1936 |